United States Patent
Kim et al.

(10) Patent No.: US 7,502,408 B2
(45) Date of Patent: Mar. 10, 2009

(54) RF TRANSCEIVER HAVING ADAPTIVE MODULATION

(75) Inventors: Joonsuk Kim, San Jose, CA (US); Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 507 days.

(21) Appl. No.: 11/168,590

(22) Filed: Jun. 28, 2005

(65) Prior Publication Data

US 2006/0239366 A1 Oct. 26, 2006

Related U.S. Application Data

(60) Provisional application No. 60/673,451, filed on Apr. 21, 2005.

(51) Int. Cl.
*H04B 1/38* (2006.01)
(52) U.S. Cl. ........................................ 375/219; 375/267
(58) Field of Classification Search ................. 375/232, 375/260, 267, 295, 299, 316, 346–350; 370/339, 370/334; 455/500, 101, 103
See application file for complete search history.

(56) References Cited

U.S. PATENT DOCUMENTS

| 6,473,467 | B1 * | 10/2002 | Wallace et al. | 375/267 |
| 6,985,434 | B2 * | 1/2006 | Wu et al. | 370/208 |
| 7,286,609 | B2 * | 10/2007 | Maltsev et al. | 375/267 |
| 2003/0112901 | A1 * | 6/2003 | Gupta | 375/340 |

OTHER PUBLICATIONS

"Interpolation Based Transmit Beamforming for MIMO-OFDM with Partial Feedback" by Jihoon Choi and Robert W. Heath, Jr. The University of Texas at Austin, Dept. of Electrical & Computer Engineering, Wireless Networking & Communications Group; Sep. 16, 2003; p. 1-14.
"Digital Beamforming Basics (Antennas)" by Hans Steyskal; Journal of Electronic Defense; Jul. 1, 1996 (7 pages).
"Utilizing Digital Downconverters for Efficient Digital Beamforming" by Clint Schreiner, Red River Engineering (5 pages).

* cited by examiner

*Primary Examiner*—Khanh C Tran
(74) *Attorney, Agent, or Firm*—Garlick Harrison & Markison; Timothy W. Markison; Jessica W. Smith (57) ABSTRACT

A modulation control module for use in an RF transceiver, the modulation control module includes a processing module and memory. The memory is operably coupled to the processing module, wherein the memory stores operational instructions that causes the processing module to: receive a multiple path channel estimation; and determining, for each transmit path of a multiple input multiple output (MIMO) wireless communication, a modulation control signal based on a corresponding portion of the multiple path channel estimation.

14 Claims, 7 Drawing Sheets

RF TRANSCEIVER HAVING ADAPTIVE MODULATION

This patent application is claiming priority under 35 USC § 119(e) to co-pending Provisional Patent Application Ser. No. 60/673,451, entitled "Reduced Feedback For Beamforming in a Wireless Communication", having a provisional filing date of Apr. 21, 2005, which is incorporated herein by reference in its entirety and made part of the present U.S. Utility Application for all purposes.

BACKGROUND OF THE INVENTION

1. Technical Field of the Invention

This invention relates generally to wireless communication systems and more particularly to adaptive modulation for multiple input multiple output (MIMO) wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve wireless communications, transceivers may incorporate beamforming. In general, beamforming is a processing technique to create a focused antenna beam by shifting a signal in time or in phase to provide gain of the signal in a desired direction and to attenuate the signal in other directions. In order for a transmitter to properly implement beamforming, it needs to know properties of the channel over which the wireless communication is conveyed. Accordingly, the receiver must provide feedback information for the transmitter to determine the properties of the channel. The feedback information may be sent as a receiver determined beamforming matrix (V) if a singular value decomposition can be determined or it may be sent as a channel matrix (H). Prior art papers (1) Digital beamforming basics (antennas) by Steyskal, Hans, Journal of Electronic Defense, Jul. 1, 1996; (2) Utilizing Digital Downconverters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003.

The transmitter receives the estimated channel matrix (H) or the receiver determined beamforming matrix (V) as feedback to adjust the transmit beamforming processing. However, such information is not used to optimize data throughput by adjusting the per channel and/or per subcarrier modulation scheme.

Therefore, a need exists for a method and apparatus that optimizes data throughput of a MIMO and/or MISO wireless communication by adjusting the per channel and/or per subcarrier modulation scheme and to adjust a corresponding demodulation scheme.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
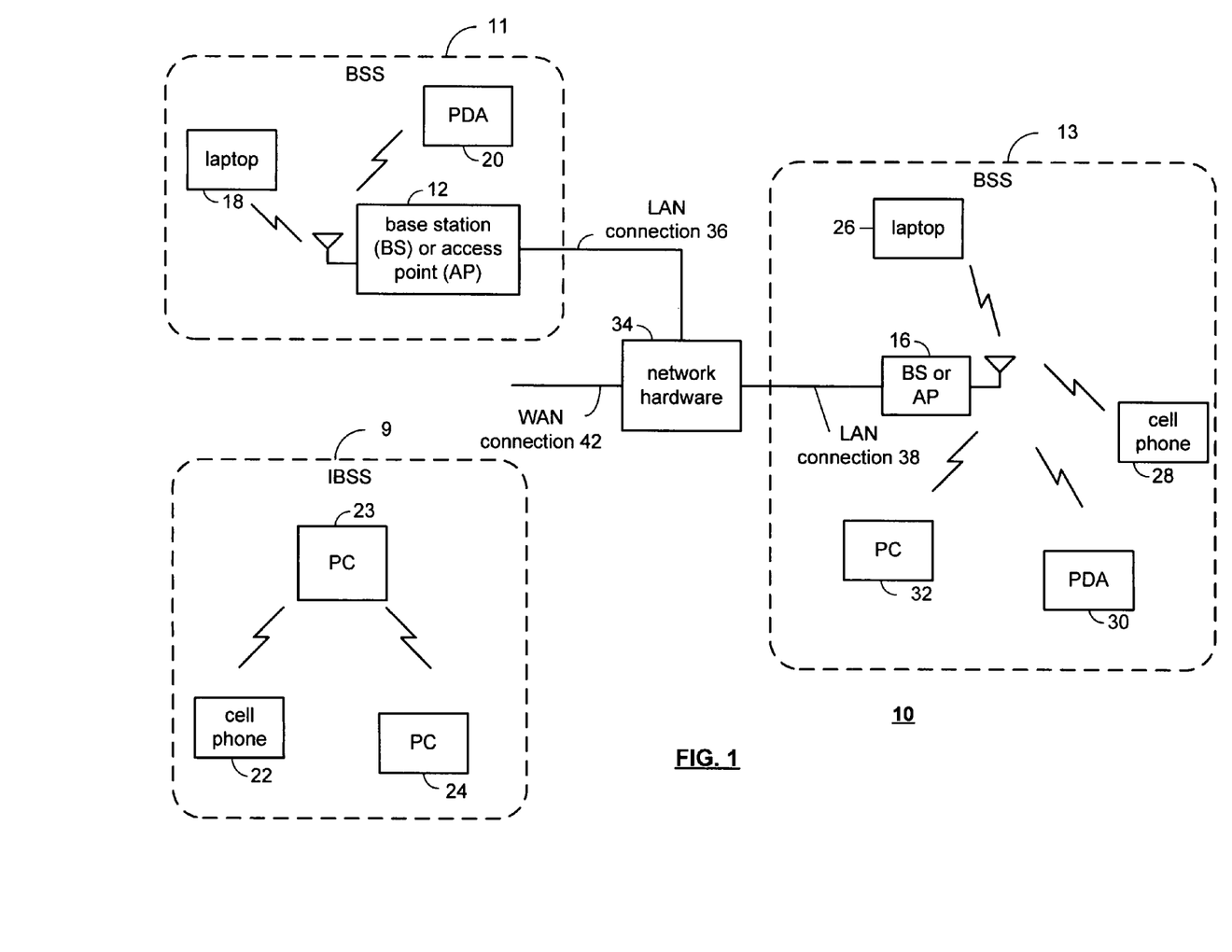
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2 and/or 3.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
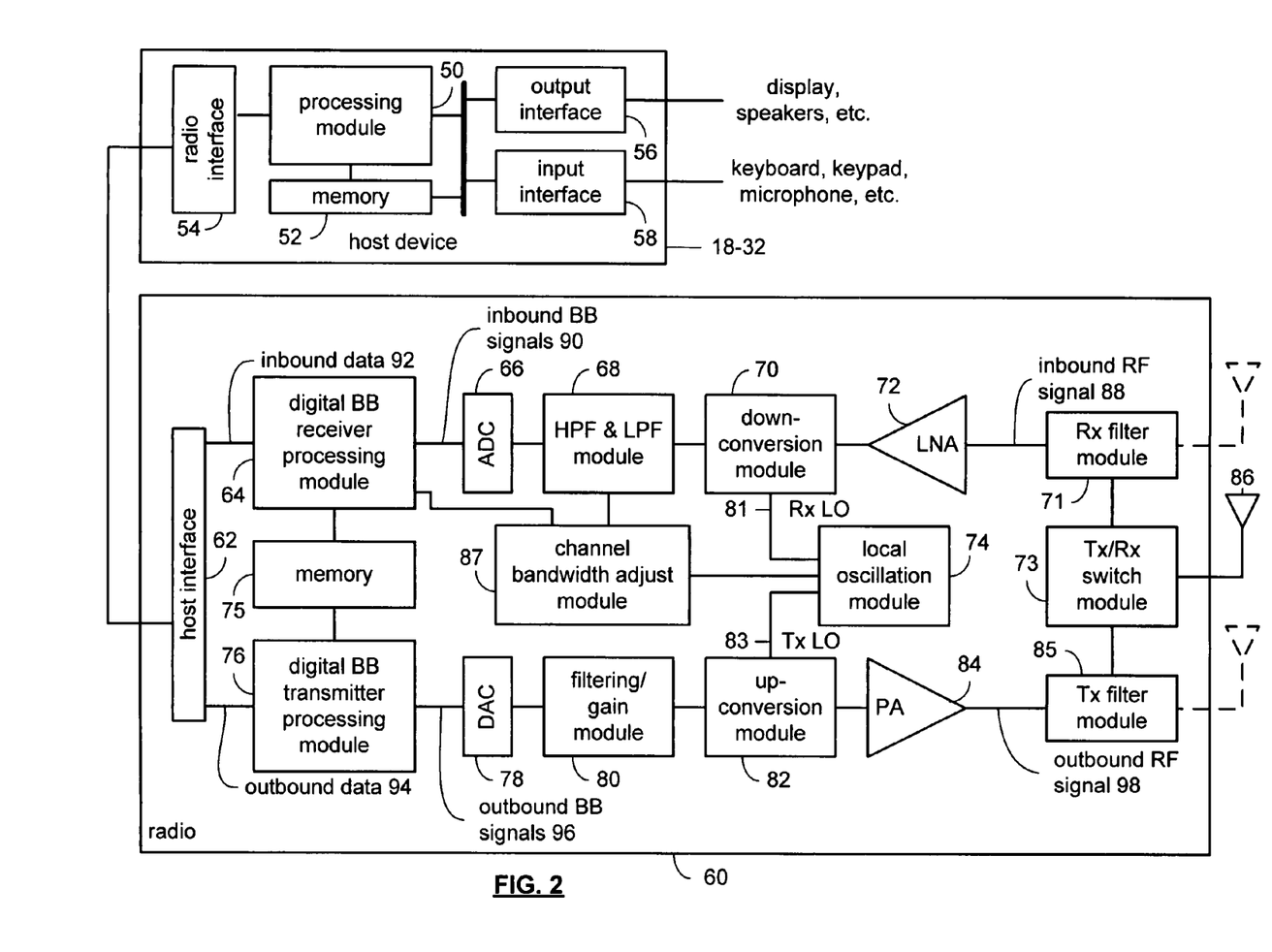
FIG. 2 is a schematic block diagram of a wireless communication device in accordance with the present invention.
Figure 3:
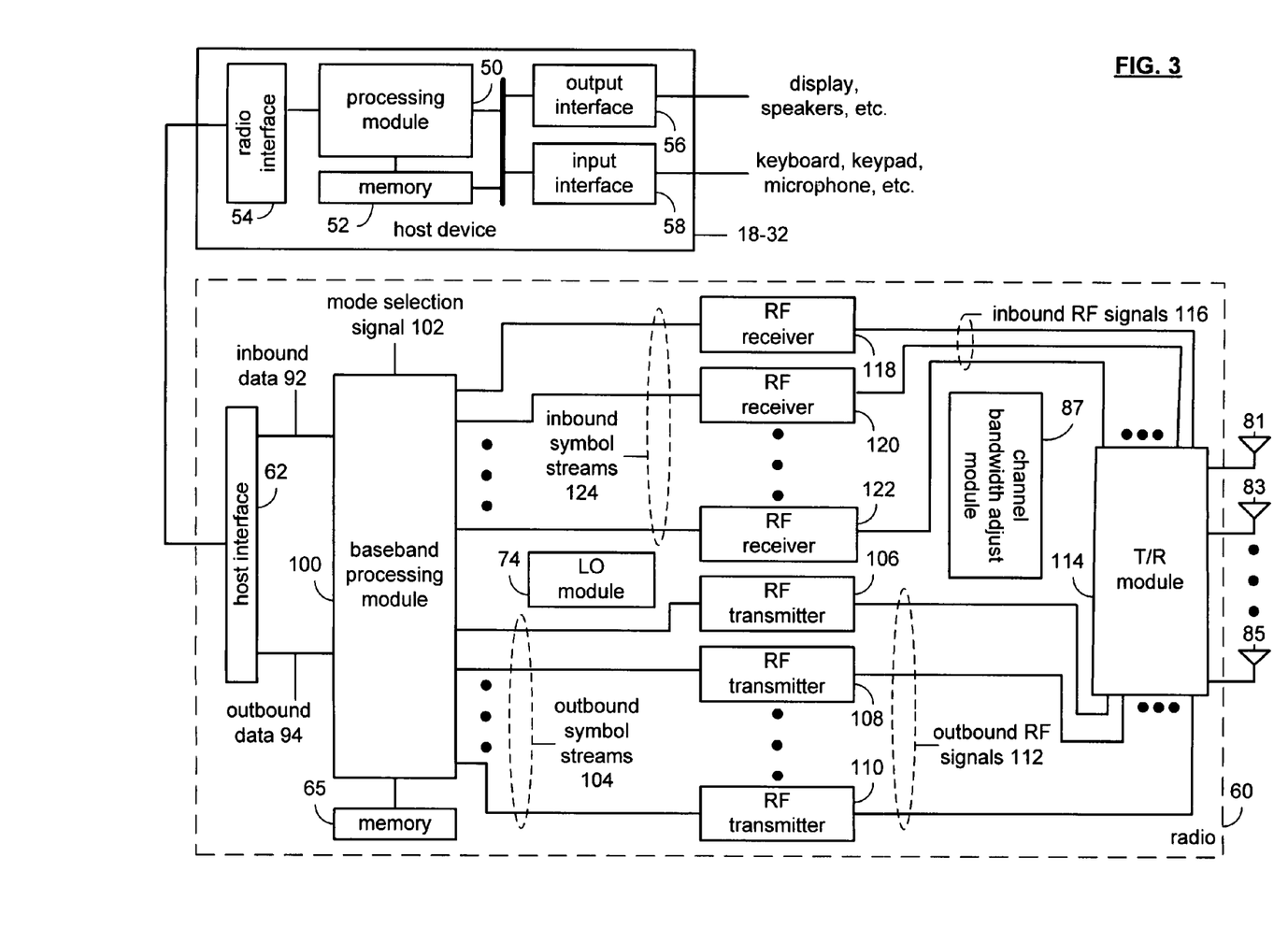
FIG. 3 is a schematic block diagram of another wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM, 64 QAM and/or 256 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122, which will be described in greater detail with reference to FIG. 4. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
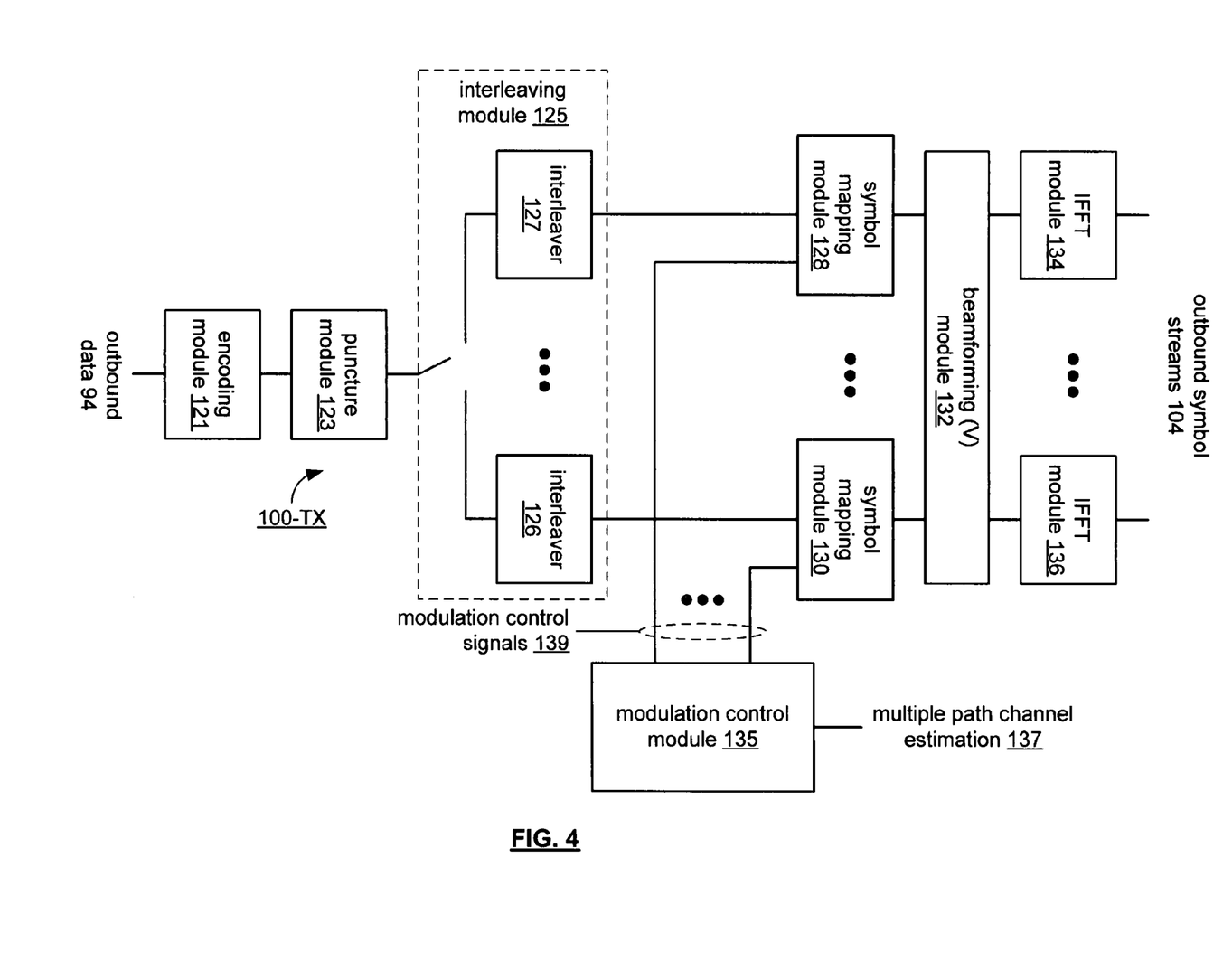
FIG. 4 is a schematic block diagram of baseband transmit processing in accordance with the present invention.

FIG. 4 is a schematic block diagram of baseband transmit processing 100-TX within the baseband processing module 100, which includes an encoding module 121, a puncture module 123, an interleaving module 125, a plurality of symbol mapping modules 128, 130, a beamforming module (V)

132, a modulation control module 135, and a plurality of inverse fast Fourier transform (IFFT) modules 134, 136 for converting the outbound data 94 into the outbound symbol stream 104. In one embodiment, the interleaving module 125 includes a switching module and a plurality of interleavers 127, 126. As one of ordinary skill in the art will appreciate, the baseband transmit processing 100-TX may include two or more of each of the interleavers 127, 126, the symbol mapping modules 128, 130, and the IFFT modules 134, 136, wherein the number of each module corresponds to the number of transmit paths of a MIMO wireless communication. In addition, one of ordinary skill in art will further appreciate that the encoding module 121, puncture module 123, the interleavers modules 127, 126, the symbol mapping modules 128, 130, and the IFFT modules 134, 136 may be function in accordance with one or more wireless communication standards including, but not limited to, IEEE 802.11a, b, g, n.

In one embodiment, the encoding module 121 is operably coupled to convert outbound data 94 into encoded data in accordance with one or more wireless communication standards. The puncture module 123 punctures the encoded data to produce punctured encoded data. The plurality of interleavers 127, 126 is operably coupled to interleave the punctured encoded data into a plurality of interleaved streams of data. The plurality of symbol mapping modules 128, 130 is operably coupled to map the plurality of interleaved streams of data into a plurality of streams of data symbols based on a plurality of modulation control signals 139 provided by the modulation module 135. The beamforming module 132 is operably coupled to beamform, using a unitary matrix having polar coordinates, the plurality of streams of data symbols into a plurality of streams of beamformed symbols. The plurality of IFFT modules 124, 136 is operably coupled to convert the plurality of streams of beamformed symbols into a plurality of outbound symbol streams.

The beamforming module 132 is operably coupled to multiply a beamforming unitary matrix (V) with baseband signals provided by the plurality of constellation mapping modules 128, 130. The beamforming unitary matrix V used by the beamforming module 132 satisfies the conditions of "V*V=VV*="I", where "I" is an identity matrix of [1 0; 0 1] for 2×2 MIMO wireless communication, is [1 0 0; 0 1 0; 0 0 1] for 3×3 MIMO wireless communication, or is [1 0 0 0; 0 1 0 0; 0 0 1 0; 0 0 0 1] for 4×4 MIMO wireless communication. In this equation, V*V means "conjugate (V) times V" and VV* means "V times conjugate (V)". Note that V may be a 2×2 unitary matrix for a 2×2 MIMO wireless communication, a 3×3 unitary matrix for a 3×3 MIMO wireless communication, and a 4×4 unitary matrix for a 4×4 MIMO wireless communication. Further note that for each column of V, a first row of polar coordinates including real values as references and a second row of polar coordinates including phase shift values.

In one embodiment, the symbol mapping modules 128, 130 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. For instance, a 16 QAM (Quadrature Amplitude Modulation) includes 16 constellation points, each corresponding to a different symbol. The particular modulation scheme used on a per transmit path basis, on a per subcarrier basis, and/or a combination thereof is dictated by the modulation control module 135 via the modulation control modules. For example, if the modulation scheme is adjusted on a per transmit path basis, the modulation control module 135 may determine that one transmit path will use a 16 QAM modulation scheme, while another may use a 64 QAM modulation scheme, and yet another transmit path may use a QPSK modulation scheme. As another example, if the modulation scheme is adjusted on a per subcarrier basis, each sub carrier of each transmit path may have a different modulation scheme. For instance, some subcarriers may have a 16 QAM modulation scheme, while others may use a 64 QAM modulation scheme, and some others may use a QPSK modulation scheme.

The modulation control module 135 determines the modulation control signals 139 based on a multiple path channel estimate 137. In one embodiment, the modulation control module 135 receiving the multiple path channel estimation 137 from another RF transceiver. From this, the modulation control module 135 determines, for each of the plurality of symbol mapping modules, a corresponding one of the plurality of modulation control signals based on a corresponding portion of the multiple path channel estimation. For instance, the modulation control module 135 may receive the multiple path channel estimation 137 as a diagonalized channel (H) based on eigen beamforming using singular value decomposition, wherein H=UDV*, such that y=Hx+n=UDV*x+n, where U corresponds to the unitary de-beamforming matrix, V corresponds to the unitary beamforming matrix, V* corresponds to a conjugate of the unitary beamforming matrix, y corresponds to the plurality of streams of frequency domain inbound baseband symbols, x corresponds to the plurality of streams of symbols, and n corresponds to noise.

For a diagonalized channel (H), the modulation control module may determine the corresponding modulation control signals for a 2×N multiple input multiple output (MIMO) wireless communication by first setting z=Vx, where V corresponds to the unitary beamforming matrix and x corresponds to the plurality of streams of symbols. The modulation control module 135 then determines a conjugate of the unitary de-beamforming matrix multiplied by the plurality of streams of frequency domain inbound baseband symbols such that U*y=U*UDV*Vz+U*n=Dz+N, where D corresponds to a diagonal matrix of D=[$s_1$ 0;0 $s_2$] and N corresponds to a noise power, and where $s_1$ and $s_2$ represent first and second signal components. In various embodiments, $s_1$ and $s_2$ represent first and second signal components, where a signal component may be a signal representation of a subcarrier of a transmit path, and/or a signal representation of the transmit path.

The modulation control module 135 then determines signal to noise ratio (SNR) for each transmit path of the MIMO wireless communication, where $SNR_1=s_1^2/N_0$, and $SNR_2=s_2^2/N_0$; where the $SNR_1$ represents the SNR for a first transmit path of the MIMO wireless communication and the $SNR_2$ represents the SNR for a second transmit path of the MIMO wireless communication. The modulation control module 135 then determines the corresponding modulated control signals based on at least one of the $SNR_1$ and the $SNR_2$. For example, for a first transmit path, if the SNR is between a first and second threshold (e.g., between 75 dB and 90 dB) a modulation scheme of 64 QAM may be used and, for a second transmit path, if the SNR is between a different set of thresholds (e.g., 60 dB and 74 dB), a modulation scheme of 16 QAM may be used. As a further example, the modulation control module 135 may determine the SNR for subcarriers of each transmit path and determine the modulation scheme for each subcarrier based on the SNR.

As another example, the modulation control module 135 may determine the corresponding modulated control signals by first determining a geometric mean for the SNR (SNRgeo) for each of the transmit paths of the MIMO wireless communication over subcarriers of an OFDM (orthogonal frequency division multiplex) frame of the MIMO wireless communication, where SNRgeo=prod(1+SNRi)$^{(1/(N-1))}$. The modulation control module 135 then determines assigned bits (b) for the each of the transmit paths based on an Aslanis formula, where b=$\log_2$(1+SNR/G), where G corresponds to margin such that $b_1$<=$\log_2$(1+SNRgeo$_1$/G$_1$) and $b_2$<=$\log_2$(1+SNRgeo$_2$/G$_2$). The modulation control module 135 then relates, or corresponds, the assigned bits for the each of the transmit paths to a modulation convention to produce the corresponding one of the plurality of modulation control signals.

As an extension of the preceding example, the modulation control module 135 may perform the corresponding of the assigned bits for the each of the transmit paths to a modulation convention by first limiting one of the assigned bits in accordance with $b_i$=floor($\log_2$(1+SNRgeo$_i$/G$_i$)/2)*2 such that a maximum $b_i$ includes 8 bits/tone/stream. The modulation control module 135 then sets a margin (G) to 0 dB. The modulation control module 135 then equates assigned bits $b_i$ of 2 to a 4QAM (quadrature amplitude modulation) modulation convention, assigned bits $b_i$ of 4 to a 16 QAM modulation convention, assigned bits $b_i$ of 6 to a 64 QAM modulation convention, and assigned bits $b_i$ of 8 to a 256 QAM modulation convention.

In one embodiment, the modulation control module 135 generates the modulation control signals as part of the mode select signal 102 to include, but not limited to, a code rate, a number of coded bits per subcarrier (NBPSC), coded bits per OFDM symbol (NCBPS), and/or data bits per OFDM symbol (NDBPS).

Figure 5:
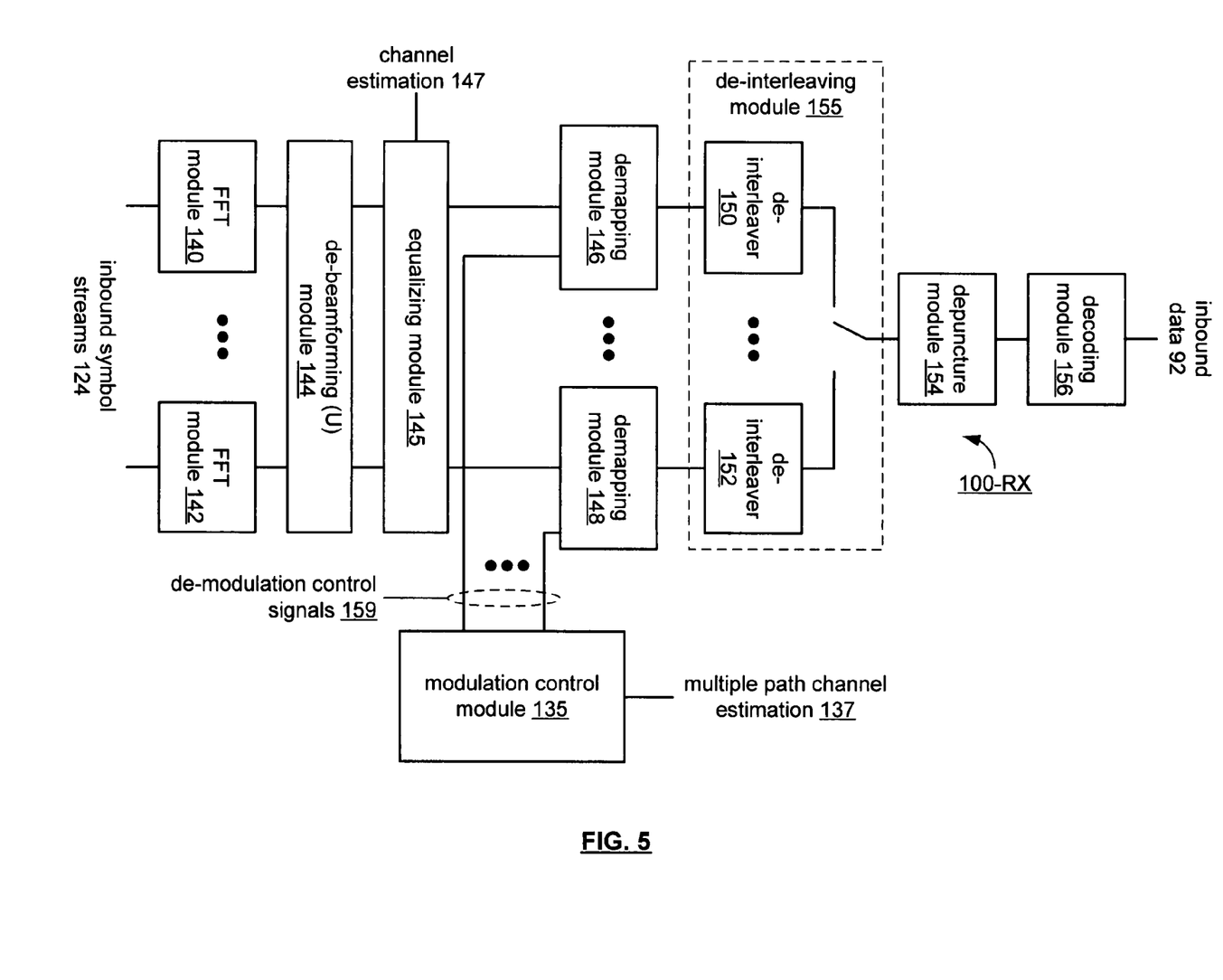
FIG. 5 is a schematic block diagram of baseband receive processing in accordance with the present invention.

FIG. 5 is a schematic block diagram of baseband receive processing 100-RX that includes a plurality of fast Fourier transform (FFT) modules 140, 142, a beamforming (U) module 144, an equalizing module 145, a plurality of demapping modules 146, 148, a deinterleaving module 155, a depuncture module 154, and a decoding module 156 for converting a plurality of inbound symbol streams 124 into inbound data 92. In one embodiment, the deinterleaving module 155 includes a switching module and a plurality of de-interleavers 150, 152. As one of ordinary skill in the art will appreciate, the baseband receive processing 100-RX may include two or more of each of the deinterleavers 150, 152, the demapping modules 146, 148, and the FFT modules 140, 142, where the number of each module corresponds to the number of receive paths (e.g., receiver antennas) in a MIMO wireless communication. In addition, one of ordinary skill in art will further appreciate that the decoding module 156, depuncture module 154, the deinterleavers 150, 152, the decoding modules 146, 148, and the FFT modules 140, 142 may be function in accordance with one or more wireless communication standards including, but not limited to, IEEE 802.11a, b, g, n.

In an embodiment, a plurality of FFT modules 140, 142 is operably coupled to convert a plurality of inbound symbol streams 124 into a plurality of streams of frequency domain inbound symbols. The de-beamforming module 144 is operably coupled to inverse beamform, using a unitary matrix having polar coordinates, the plurality of streams of beamformed symbols into a plurality of streams of de-beamformed inbound symbols. The equalizing module 145 is operably coupled to equalize the plurality of streams of de-beamformed inbound baseband symbols in accordance with a channel estimation 147 to produce a plurality of streams of equalized de-beamformed inbound baseband symbols. The channel estimation 147 may be derived using one or more of a plurality of known methods for determining a channel response.

The plurality of demapping modules 146, 148 is operably coupled to demap plurality of streams of equalized de-beamformed inbound baseband symbols in accordance with a plurality of demodulation signals 159 to produce a plurality of streams of inbound baseband signals. The deinterleaver 150, 152 are operably coupled to deinterleave the plurality of inbound baseband signals to produce demodulated inbound baseband signals. The decoding module 156 is operably coupled to convert the demodulated inbound baseband signals into inbound data 92.

In an embodiment, the beamforming module 144 is operably coupled to multiply a beamforming unitary matrix (U) with baseband signals provided by the plurality of FFT modules 140, 142. The beamforming unitary matrix U used by the beamforming module 144 satisfies the conditions of "U*U=UU*="I", where "I" is an identity matrix of [1 0; 0 1] for 2×2 MIMO wireless communication, is [1 0 0; 0 1 0; 0 0 1] for 3×3 MIMO wireless communication, or is [1 0 0 0; 0 1 0 0; 0 0 1 0; 0 0 0 1] for 4×4 MIMO wireless communication. In this equation, U*U means "conjugate (U) times U" and UU* means "U times conjugate (U)". Note that U may be a 2×2 unitary matrix for a 2×2 MIMO wireless communication, a 3×3 unitary matrix for a 3×3 MIMO wireless communication, and a 4×4 unitary matrix for a 4×4 MIMO wireless communication. Further note that for each column of U, a first row of polar coordinates including real values as references and a second row of polar coordinates including phase shift values.

In an embodiment, the FFT modules 140, 142 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map.

The modulation control module 135 is operably coupled to generate the demodulation control signals 159 based on a multiple channel path estimation. In one embodiment, the modulation control module 135 generates the plurality of demodulation control signals by interpreting a signal field of a frame received from another RF transceiver.

Figure 6:
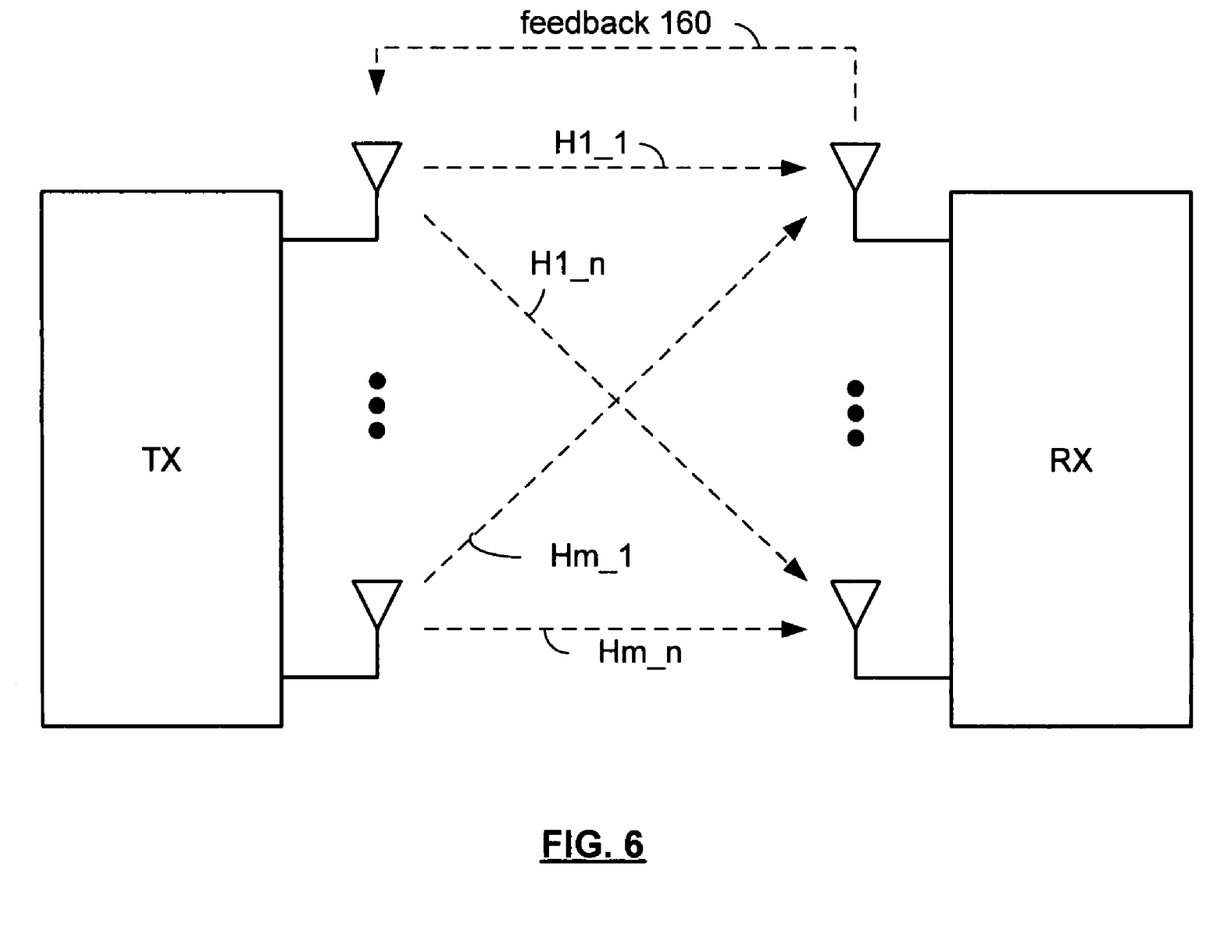
FIG. 6 is a schematic block diagram of a beamforming wireless communication in accordance with the present invention.

FIG. 6 is a schematic block diagram of a MIMO wireless communication between a transmitting wireless communication device (TX) and a receiving wireless communication device (RX). In this illustration, the MIMO wireless communication is a M by N MIMO wireless communication (i.e., the transmitter includes M transmit antennas and N receiver antennas. The multiple path channel may be represented as a matrix (H), which is a function of the individual channel paths H1_1, H1_n, Hm_1, Hm_n. The receiver RX may calculate the multiple path channel matrix H based on the equation H=UDV* (H—represents the channel, U is the receiver de-beamforming unitary matrix, and V* is the conjugate of the transmitter beamforming unitary matrix). With H=UDV*, y (the received signal)=Hx+N, where x represents the transmitted signals and N represents noise. If z=Vx, then U*y=U*UDV*VZ+U*n=Dz+N, where D corresponds to a diagonal matrix of D=[$s_1$ 0;0 $s_2$] and N corresponds to a noise power, and where $s_1$ and $s_2$ represent first and second signal components. In various embodiments, $s_1$ and $s_2$ represent first and second signal components, where a signal component may be a signal representation of a subcarrier of a transmit path, and/or a signal representation of the transmit path.

Upon determining the multiple path channel matrix H and the conjugate of the transmitter beamforming unitary matrix V*, the receiver RX provides a feedback signal 160 to the transmitter TX. The feedback 160 may be the channel matrix H and/or the conjugate of the transmitter beamforming unitary matrix V*. From either type of feedback, the transmitter TX determines the modulation and demodulation control signals.

Figure 7:
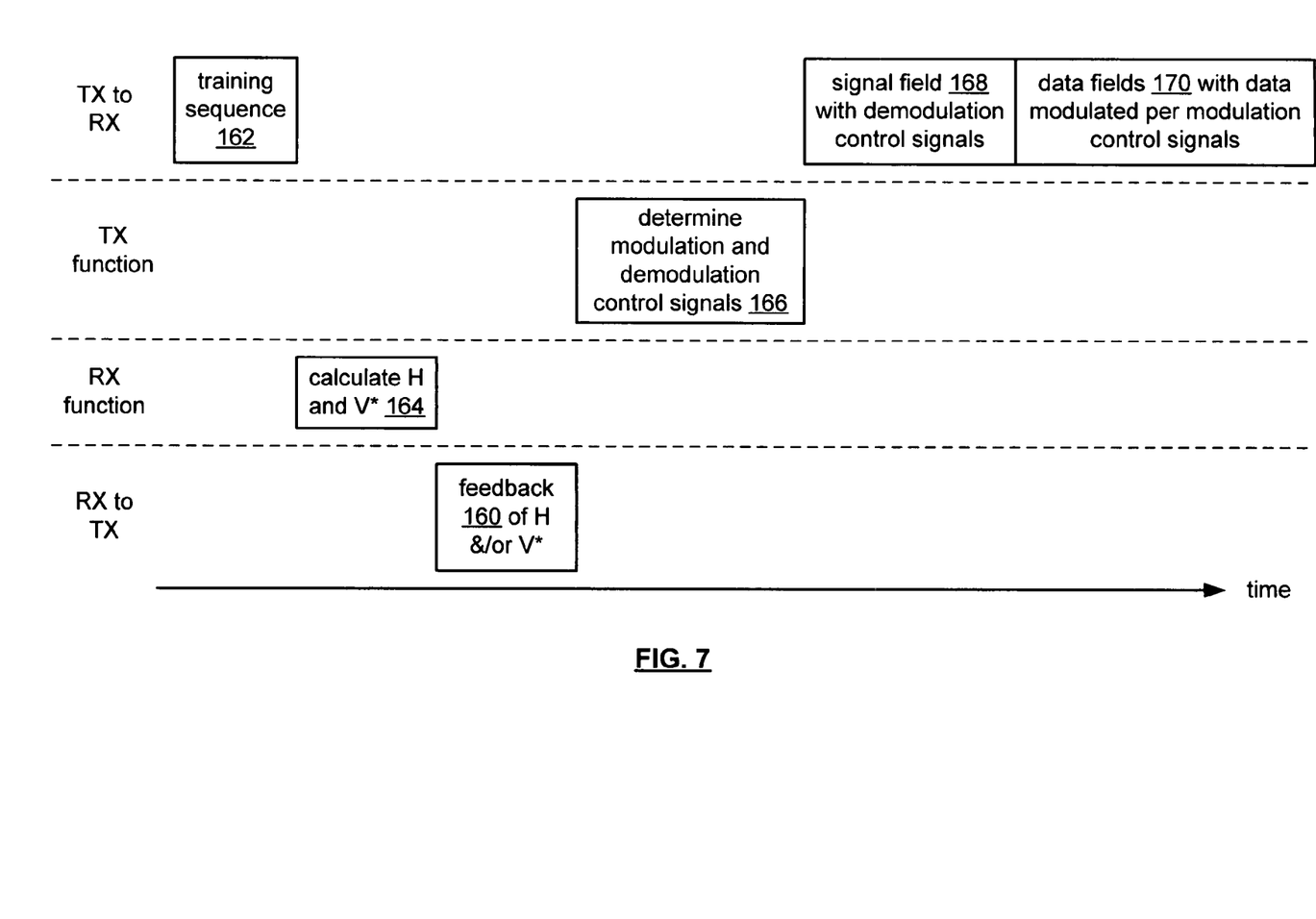
FIG. 7 is a diagram of adaptive modulation of a wireless communication in accordance with the present invention.

FIG. 7 is a diagram illustrating a MIMO wireless communication. In this illustration, a MIMO wireless communication begins when a transmitter transmits a training sequence 162 to a receiver. The training sequence may be in accordance with one or more wireless communication standards (e.g., IEEE 802.11a, b, g, n, etc.). As the receiver is receiving the training sequence, it is calculating 164 the channel matrix H and may also be determining the conjugate of the transmitter beamforming unitary matrix V*. Once the receiver has completed this calculation, it transmits feedback 160 to the transmitter. The feedback 160 may be the channel matrix H and/or the conjugate of the transmitter beamforming unitary matrix V*. Note that the feedback 160 may further include the diagonal matrix D.

Upon receiving the feedback, 160 the transmitter TX functions to determine the modulation and demodulation control signals 166. This may be done as previously discussed with reference to FIG. 4. The transmitter then generates a frame that includes a signal field 168 and a plurality of data fields 170. The signal field 168 includes the demodulation control signals and the data fields 170 include data that has been modulated in accordance with the modulation control signals.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for optimizing data throughput of a MIMO wireless communication. As one of average skill in the art will appreciate, other embodiments may be derived from the present teachings without deviating from the scope of the claims. For instance, adaptive modulations using SVD (singular value decomposition) enables the assigning of more bits on better space mode channels and less bits on worse space mode channels such that the probability of wrong detection of signals is reduced, thereby increasing margin. Note that in one embodiment, the first singular value is greater than the second singular value and, as such, the transmission through the first space mode is more reliable than through the second space mode.

What is claimed is:

1. A radio frequency (RF) transceiver having adaptive modulation, the RF transceiver comprises:
   an RF front-end operably coupled to convert a plurality of streams of outbound baseband signals into outbound RF signals and to convert inbound RF signals into a plurality of streams of inbound baseband signals;
   a baseband receiver section including:
      a plurality of fast Fourier transform modules operably coupled to convert a corresponding one of the plurality of streams of inbound baseband signals from a time domain to a frequency domain to produce a plurality of streams of frequency domain inbound baseband symbols;
      a de-beamforming module operably coupled to multiply the plurality of streams of frequency domain inbound baseband symbols by a unitary de-beamforming matrix to produce a plurality of streams of de-beamformed inbound baseband symbols;
      an equalizing module operably coupled to equalize the plurality of streams of de-beamformed inbound baseband symbols in accordance with a channel estimation to produce a plurality of streams of equalized de-beamformed inbound baseband symbols;
      a plurality of de-mapping modules operably coupled to demap the plurality of streams of equalized de-beamformed inbound baseband symbols in accordance with a plurality of demodulation control signals to produce a plurality of streams of inbound baseband signals;
      a deinterleaving module operably coupled to deinterleave the plurality of streams of inbound baseband signals to produce demodulated inbound baseband signals; and
      decoding module operably coupled to decode the demodulated inbound baseband signals from each of the plurality of baseband demodulating paths to produce inbound data;
   a baseband transmitter section including:
      an encoding module operably coupled to encode outbound data to produce encoded data;
      an interleaving module operably coupled to interleave the encoded data into a plurality of interleaved encoded data streams;
      a plurality of symbol mapping modules operably coupled to map, in accordance with a plurality of modulation control signals, the plurality of interleaved encoded data streams into a plurality of streams of symbols;
      a beamforming module operably coupled to multiplying the plurality of streams of symbols by a unitary beamforming matrix to produce a plurality of beamformed streams of symbols; and
      a plurality of inverse fast Fourier transform modules operably coupled to convert the plurality of beamformed streams of symbols from a frequency domain to a time domain to produce the plurality of streams of outbound baseband signals; and
   modulation control module operably coupled to produce the plurality of demodulation control signals and the plurality of modulation control signals based on a multiple path channel estimation, wherein the modulation control module functions to produce the plurality of modulation control signals by:

receiving the multiple path channel estimation from another RF transceiver; and determining, for each of the plurality of symbol mapping modules, a corresponding one of the plurality of modulation control signals based on a corresponding portion of the multiple path channel estimation, wherein the multiple path channel estimation comprises a diagonalized channel (H) based on eigen beamforming using singular value decomposition, wherein $H=UDV^*$, such that $y=Hx+n=UDV^*x+n$, where U corresponds to the unitary de-beamforming matrix, V corresponds to the unitary beamforming matrix, $V^*$ corresponds to a conjugate of the unitary beamforming matrix, y corresponds to the plurality of streams of frequency domain inbound baseband symbols, x corresponds to the plurality of streams of symbols, and n corresponds to noise.

2. The RF transceiver of claim 1, wherein the modulation control module functions to produce the plurality of demodulation control signals by:

interpreting a signal field of a frame received from another RF transceiver.

3. The RF transceiver of claim 1, wherein the determining, for each of the plurality of symbol mapping modules, a corresponding one of the plurality of modulation control signals comprises for a 2×N multiple input multiple output (MIMO) wireless communication:

setting $z=Vx$;

determining a conjugate of the unitary de-beamforming matrix multiplied by the plurality of streams of frequency domain inbound baseband symbols such that $U^*y=U^*UDV^*Vz+U^*n=Dz+N$, where D corresponds to a diagonal matrix of $D=[s_1\ 0;0\ s_2]$ and N corresponds to a noise power, and where $s_1$ and $s_2$ represent first and second signal components;

determining signal to noise ratio (SNR) for each transmit path of the MIMO wireless communication, where $SNR_1=s_1^2/N_0$, and $SNR_2=s_2^2/N_0$, where the $SNR_1$ represents the SNR for a first transmit path of the MIMO wireless communication and the $SNR_2$ represents the SNR for a second transmit path of the MIMO wireless communication; and determining the corresponding one of the plurality of modulated control signals based on at least one of the $SNR_1$ and the $SNR_2$.

4. The RF transceiver of claim 3, wherein the determining the corresponding one of the plurality of modulated control signals further comprises:

determining a geometric mean for the SNR (SNRgeo) for each of the transmit paths of the MIMO wireless communication over subcarriers of an OFDM (orthogonal frequency division multiplex) frame of the MIMO wireless communication, where $SNRgeo=prod(1+SNRi)^{1/(N-1)}$;

determining assigned bits (b) for the each of the transmit paths based on an Aslanis formula, where $b=\log_2(1+SNR/G)$, where G corresponds to margin such that $b_1<=\log_2(1+SNRgeo_1/G_1)$ and $b_2>=\log_2(1+SNRgeo_2/G_2)$; and corresponding the assigned bits for the each of the transmit paths to a modulation convention to produce the corresponding one of the plurality of modulation control signals.

5. The RF transceiver of claim 4, wherein the corresponding the assigned bits for the each of the transmit paths to a modulation convention further comprises:

limiting one of the assigned bits in accordance with $b_i=floor(\log_2(1+SNRgeo_i/G_i)/2)*2$ such that a maximum $b_i$ includes 8 bits/tone/stream;

setting margin (G) to 0 dB; and equating a $b_i$ of 2 to a 4 QAM (quadrature amplitude modulation) modulation convention, a $b_i$ of 4 to a 16 QAM modulation convention, a $b_i$ of 6 to a 64 QAM modulation convention, and a $b_i$ of 8 to a 256 QAM modulation convention.

6. A baseband transmit processing module comprises:

an encoding module operably coupled to encode outbound data to produce encoded data;

an interleaving module operably coupled to interleave the encoded data into a plurality of interleaved encoded data streams;

a plurality of symbol mapping modules operably coupled to map, in accordance with a plurality of modulation control signals, the plurality of interleaved encoded data streams into a plurality of streams of symbols;

a beamforming module operably coupled to multiplying the plurality of streams of symbols by a beamforming matrix to produce a plurality of beamformed streams of symbols; and a plurality of inverse fast Fourier transform modules operably coupled to convert the plurality of beamformed streams of symbols from a frequency domain to a time domain to produce the plurality of streams of outbound baseband signals;

modulation control module operably coupled to produce the plurality of modulation control signals based on a multiple path channel estimation; and wherein the modulation control module functions to produce the plurality of modulation control signals by:

receiving the multiple path channel estimation from another RF transceiver; and determining, for each of the plurality of symbol mapping modules, a corresponding one of the plurality of modulation control signals based on a corresponding portion of the multiple path channel estimation, wherein the multiple path channel estimation comprises a diagonalized channel (H) based on eigen beamforming using singular value decomposition, wherein $H=UDV^*$, such that $y=Hx+n=UDV^*x+n$, where U corresponds to a unitary de-beamforming matrix, V corresponds to a unitary beamforming matrix, $V^*$ corresponds to a conjugate of the unitary beamforming matrix, y corresponds to the plurality of streams of frequency domain inbound baseband symbols, x corresponds to the plurality of streams of symbols, and n corresponds to noise.

7. The baseband transmit processing module of claim 6, wherein the modulation control module functions to:

produce a plurality of demodulation control signals; and include the plurality of demodulation control signals in a signal field of a frame.

8. The baseband transmit processing module of claim 6, wherein the determining, for each of the plurality of symbol mapping modules, a corresponding one of the plurality of modulation control signals comprises for a 2×N multiple input multiple output (MIMO) wireless communication:

setting $z=Vx$;

determining a conjugate of the unitary de-beamforming matrix multiplied by the plurality of streams of frequency domain inbound baseband symbols such that $U^*y=U^*UDV^*Vz+U^*n=Dz+N$, where D corresponds to a diagonal matrix of $D=[s_1\ 0; 0\ s_2]$ and N corresponds to a noise power and where $s_1$ and $s_2$ represent first and second signal components;

determining signal to noise ratio (SNR) for each transmit path of the MIMO wireless communication, where $SNR_1 = s_1^2/N_0$, and $SNR_2 = s_2^2/N_0$;, where the $SNR_1$ represents the SNR for a first transmit path of the MIMO wireless communication and the $SNR_2$ represents the SNR for a second transmit path of the MIMO wireless communication; and determining the corresponding one of the plurality of modulated control signals based on at least one of the $SNR_1$ and the $SNR_2$.

9. The baseband transmit processing module of claim 8, wherein the determining the corresponding one of the plurality of modulated control signals further comprises:

determining a geometric mean for the SNR (SNRgeo) for each of the transmit paths of the MIMO wireless communication over subcarriers of an OFDM (orthogonal frequency division multiplex) frame of the MIMO wireless communication, where $SNRgeo = prod(1+SNRi)^{1/(N-1)}$;

determining assigned bits (b) for the each of the transmit paths based on an Aslanis formula, where $b = \log_2(1+SNR/G)$, where G corresponds to margin such that $b_1 <= \log_2(1+SNRgeo_1/G_1)$ and $b_2 <= \log_2(1+SNRgeo_2/G_2)$; and corresponding the assigned bits for the each of the transmit paths to a modulation convention to produce the corresponding one of the plurality of modulation control signals.

10. The baseband transmit processing module of claim 9, wherein the corresponding the assigned bits for the each of the transmit paths to a modulation convention further comprises:

limiting one of the assigned bits in accordance with $b_i = floor(\log_2(1+SNRgeo_i/G_i)/2)*2$ such that a maximum $b_i$ includes 8 bits/tone/stream;

setting margin (G) to 0 dB; and equating a $b_i$ of 2 to a 4 QAM (quadrature amplitude modulation) modulation convention, a $b_i$ of 4 to a 16 QAM modulation convention, a $b_i$ of 6 to a 64 QAM modulation convention, and a $b_i$ of 8 to a 256 QAM modulation convention.

11. A modulation control module comprises:

processing module; and memory operably coupled to the processing module, wherein the memory stores operational instructions that causes the processing module to:

receive a multiple path channel estimation; and determining, for each transmit path of a multiple input multiple output (MIMO) wireless communication, a modulation control signal based on a corresponding portion of the multiple path channel estimation; and wherein the multiple path channel estimation comprises a channel characterization (H), wherein $H = UDV^*$, such that $y = Hx+n = UDV^*x+n$, where U corresponds to a unitary de-beamforming matrix, V corresponds to a unitary beamforming matrix, $V^*$ corresponds to a conjugate of the unitary beamforming matrix, y corresponds to a plurality of streams of received baseband symbols, x corresponds to the plurality of streams of transmitted baseband symbols, and n corresponds to noise.

12. The modulation control module of claim 11, wherein the memory comprises operational instructions that cause the processing module to determine, for each transmit path, the modulation control signal comprises for a 2×N multiple input multiple output (MIMO) wireless communication by:

setting $z = Vx$;

determining a conjugate of the unitary de-beamforming matrix multiplied by the plurality of streams of frequency domain inbound baseband symbols such that $U^*y = U^*UDV^*Vz + U^*n = Dz + N$, where D corresponds to a diagonal matrix of $D = [S_1\ 0; 0\ s_2]$ and N corresponds to a noise power and where $s_1$ and $S_2$ represent first and second signal components;

determining signal to noise ratio (SNR) for each transmit path of the MIMO wireless communication, where $SNR_1 = s_1^2/N_0$, and $SNR_2 = s_2^2/N_0$;, where the $SNR_1$ represents the SNR for a first transmit path of the MIMO wireless communication and the $SNR_2$ represents the SNR for a second transmit path of the MIMO wireless communication; and determining the corresponding one of the plurality of modulated control signals based on at least one of the $SNR_1$ and the $SNR_2$.

13. The modulation control module of claim 12, wherein the memory comprises operational instructions that cause the processing module to determine the corresponding one of the plurality of modulated control signals by:

determining a geometric mean for the SNR (SNRgeo) for each of the transmit paths of the MIMO wireless communication over subcarriers of an OFDM (orthogonal frequency division multiplex) frame of the MIMO wireless communication, where $SNRgeo = prod(1+SNRi)^{1/(N-1)}$;

determining assigned bits (b) for the each of the transmit paths based on an Aslanis formula, where $b = \log_2(1+SNR/G)$, where G corresponds to margin such that $b_1 <= \log_2(1+SNRgeo_1/G_1)$ and $b_2 <= \log_2(1+SNRgeo_2/G_2)$; and corresponding the assigned bits for the each of the transmit paths to a modulation convention to produce the corresponding one of the plurality of modulation control signals.

14. The modulation control module of claim 13, wherein the memory comprises operational instructions that cause the processing module to correspond the assigned bits for the each of the transmit paths to a modulation convention further comprises:

limiting one of the assigned bits in accordance with $b_i = floor(\log_2(1+SNRgeo_i/G_i)/2)*2$ such that a maximum $b_i$ includes 8 bits/tone/stream;

setting margin (G) to 0 dB; and equating a $b_i$ of 2 to a 4 QAM (quadrature amplitude modulation) modulation convention, a $b_i$ of 4 to a 16 QAM modulation convention, a $b_i$ of 6 to a 64 QAM modulation convention, and a $b_i$ of 8 to a 256 QAM modulation convention.

* * * * *

UNITED STATES PATENT AND TRADEMARK OFFICE
CERTIFICATE OF CORRECTION

PATENT NO. : 7,502,408 B2
APPLICATION NO. : 11/168590
DATED : March 10, 2009
INVENTOR(S) : Joonsuk Kim and Christopher J. Hansen Page 1 of 1

It is certified that error appears in the above-identified patent and that said Letters Patent is hereby corrected as shown below:

Column 15, line 42, in Claim 3: after the second occurring "N" with subscript "0" insert a --semi-colon--

Signed and Sealed this

Thirtieth Day of June, 2009

JOHN DOLL
*Acting Director of the United States Patent and Trademark Office*